United States Patent [19]

Moore

[11] Patent Number: 5,058,373
[45] Date of Patent: Oct. 22, 1991

[54] OVERSPEED PROTECTION FOR A GAS TURBINE/STEAM TURBINE COMBINED CYCLE

[75] Inventor: James H. Moore, Schenectady, N.Y.

[73] Assignee: General Electric Company, Schenectady, N.Y.

[21] Appl. No.: 590,820

[22] Filed: Oct. 1, 1990

Related U.S. Application Data

[62] Division of Ser. No. 302,169, Jan. 26, 1989, abandoned.

[51] Int. Cl.$^5$ .............................................. F02C 6/18
[52] U.S. Cl. ............................................... 60/39.27
[58] Field of Search ............... 60/39.182, 39.27, 39.29; 415/27

[56] References Cited

U.S. PATENT DOCUMENTS

| | | | |
|---|---|---|---|
| 2,936,028 | 5/1960 | Gatzemeyer et al. | 158/36.4 |
| 3,097,488 | 7/1963 | Eggenberger et al. | 60/73 |
| 3,098,190 | 7/1963 | Spencer et al. | 322/29 |
| 3,150,487 | 9/1964 | Mangan et al. | 60/39.18 |
| 3,198,954 | 8/1965 | Eggenberger et al. | 290/40 |
| 3,340,883 | 9/1967 | Peternel | 137/26 |
| 3,418,806 | 12/1968 | Wagner et al. | 60/39.51 |
| 3,505,811 | 4/1970 | Underwood | 60/39.03 |
| 3,520,133 | 7/1970 | Loft et al. | 60/39.14 |
| 3,561,216 | 2/1971 | Moore, Jr. | 60/73 |
| 3,601,617 | 8/1971 | De Mello et al. | 290/40 C |
| 3,738,104 | 6/1973 | Rosa | 60/39.28 R |
| 3,756,029 | 9/1973 | Aquet | 60/39.182 |
| 3,879,616 | 4/1975 | Baker et al. | 60/39.182 |
| 3,978,658 | 9/1976 | Forbes et al. | 60/39.29 |
| 4,081,956 | 4/1978 | Baker et al. | 60/39.182 |
| 4,519,207 | 5/1985 | Okabe et al. | 60/39.182 |
| 4,532,761 | 8/1985 | Takaoka et al. | 60/39.13 |

FOREIGN PATENT DOCUMENTS

| | | |
|---|---|---|
| 62-38525 | 2/1987 | Japan . |
| 1050063A | 12/1966 | United Kingdom . |
| 2017219A | 2/1979 | United Kingdom . |
| 2099516A | 8/1982 | United Kingdom . |

OTHER PUBLICATIONS

Shepherd, D. G. *Principles of Turbomachinery* McMillan Company, New York, 1956, p. 50.
Patent Abstracts of Japan, vol. 7, No. 169 (M-231)(1314) Jul. 26, 1983 and JP-A-58 74809, May 6, 1983.
Patent Abstracts of Japan, vol. 10, No. 261 (M-514)(2317) Sep. 5, 1986 and JP-A-61 87902, May 6, 1986.

*Primary Examiner*—Louis J. Casaregola
*Attorney, Agent, or Firm*—Nixon & Vanderhye

[57] ABSTRACT

A gas turbine is solidly coupled with rigid couplings in tandem with a reheat steam tubine and utilizes the combined inertia of the rotating members and the braking torque of the gas turbine air compressor to assist a single control system to limit overspeed of the complete unit. In its broadest and preferred form, the normal intercept steam valves and reheat stop valve between the reheater and the lower pressure steam turbine sections are eliminated, and the high pressure steam control valves are used to prevent overspeed, with steam flowing through a "valveless" conduit from the reheater to the lower pressure steam turbine sections. The control system includes means for sensing a potential overspeed condition and operating the control valves to prevent overspeed.

In a modified form of the invention a dump valve may be provided between the air compressor discharge and the combustion chamber of the gas turbine. In the modified form the control system will also open the dump valve, or the dump valve may open automatically upon compressor discharge pressure exceeding a preselected value.

7 Claims, 2 Drawing Sheets

OVERSPEED PROTECTION FOR A GAS TURBINE/STEAM TURBINE COMBINED CYCLE

This is a division of application Ser. No. 07/302,169, filed Jan. 26, 1989 (abandoned).

BACKGROUND OF THE INVENTION

This invention relates generally to a large combined cycle gas turbine and reheat steam turbine power plant driving a load such as a large generator. More particularly, the invention concerns an improved method for preventing occurrence of destructive overspeed in such a combined cycle power plant upon sudden loss in load.

With large steam turbine generators the steam is normally reheated in a reheater section of the boiler after it passes through the high pressure turbine section and before it is expanded in the intermediate pressure and lower pressure turbine sections. Control valves at the inlet to the high Pressure turbine are augmented by intercept valves between the reheater and the intermediate pressure turbine in order to intercept the high energy steam in the reheater before it can expand in the lower pressure turbines and contribute to overspeed. The control valves and intercept valves are backed up by main stop valves and reheat stop valves respectively as a second line of defense in the event of a control valve or intercept valve failure.

The reheater in the steam generator contains a significant mass of high energy steam which, in the absence of becoming trapped by the intercept valves flows into the lower pressure turbine sections and is converted to kinetic energy which contributes to overspeed. Some of this reheater steam contributes to overspeed by flowing through the intercept valves even while they are closing.

As the ratings of steam turbine generators have increased, the problem of limiting overspeed upon loss of load has become more severe A variety of control devices have been developed either to close the valves faster or to begin closing them sooner than would occur by speed governor action alone. Closing of the valves when an unbalance first occurs between steam turbine torque and generator electrical load is disclosed in U.S. Pat. No. 3,198,954 —Eggenberger et al., which is incorporated herein by reference. Other arrangements include application of additional electrical resistance as a load on the generator as suggested in U.S. Pat. No. 3,098,190 — Spencer, et al. The foregoing patents are assigned to the Present assignee. Various braking arrangements have also been suggested to add mechanical load; reversing turbine stages have been suggested.

Gas turbines do not have as difficult an overspeed control problem because a large portion of the total torque developed by the turbine is required to drive the air compressor. Furthermore, the torque required to drive the compressor is not a linear function of speed but increases approximately as the square of speed.

Combined cycle power plants having both a steam and a gas turbine have been proposed, with the steam and gas turbine connected in tandem on opposite ends of a generator. Such a combined cycle power plant is illustrated in U.S. Pat. No. 4,519,207—Okabe, et al., showing a two pressure level heat recovery steam generator of the non-reheat type supplying steam to a turbine connected in tandem with a gas turbine and driving a generator. Such a system would normally connect the rotors with "flexible couplings," which provide for thermal expansion and contraction. However, a flexible coupling may possibly fail in fatigue from any misalignment, which causes it to flex with each revolution. In the event of failure of the flexible coupling, the steam turbine could become completely separated from its load and therefore in a combined cycle plant, the steam turbine and gas turbine each have independent controls to Prevent overspeed.

Japanese patent publication 62-38525 dated Aug. 18, 1987 discloses a non-reheat steam turbine/gas turbine combined cycle power plant having a single thrust bearing between the steam turbine and the gas turbine and coupled to a generator with rigid couplings. This publication concerns only arrangement of turbine units and discloses no steam generator or control system for the system.

Improved means are needed for controlling or reducing excessive overspeed in the event of loss of load in a large combined cycle gas turbine and reheat steam turbine power plant, without increasing the cost of the control system.

Accordingly, one object of the present invention is to provide an improved method for preventing overspeed in a large combined cycle gas turbine and reheat steam turbine power plant.

Another object of the invention is to provide an improved combined cycle power plant with a reheat steam turbine permitting elimination of the conventional reheat stop valve and intercept valve.

SUMMARY OF THE INVENTION

Briefly stated, the invention is practiced by solidly coupling the gas turbine in tandem with a reheat steam turbine and utilizing the combined inertia of the rotating members and the braking torque of the gas turbine air compressor to assist a single control system to limit overspeed of the complete unit. In its broadest and preferred form, the normal intercept steam valves and reheat stop valve between the reheater and the intermediate pressure turbine are eliminated, and the high pressure steam control valves are used to prevent overspeed, with steam flowing through a "valveless" conduit from the reheater to the lower pressure steam turbine sections. The control system includes means for sensing a potential overspeed condition and operating the control valves to prevent overspeed.

In a modified form of the invention, a dump valve may be provided between the air compressor discharge and the combustion chamber of the gas turbine. In the modified form the control system will also open the dump valve, or the dump valve may open automatically upon compressor discharge pressure exceeding a preselected value.

DRAWING

The subject matter which is regarded as the invention is particularly pointed out and distinctly claimed in the concluding portion of the specification. The invention, however, both as to organization and method of practice together with further objects and advantages thereof, may best be understood by reference to the following description, taken in connection with the accompanying drawing, in which:

FIG. 1 is a simplified schematic view of a large combined cycle power plant, and FIGS. 2 and 3 are partial schematic views showing modified forms of the invention with dump valves at the compressor discharge.

DESCRIPTION OF THE PREFERRED EMBODIMENT

Figure 1:
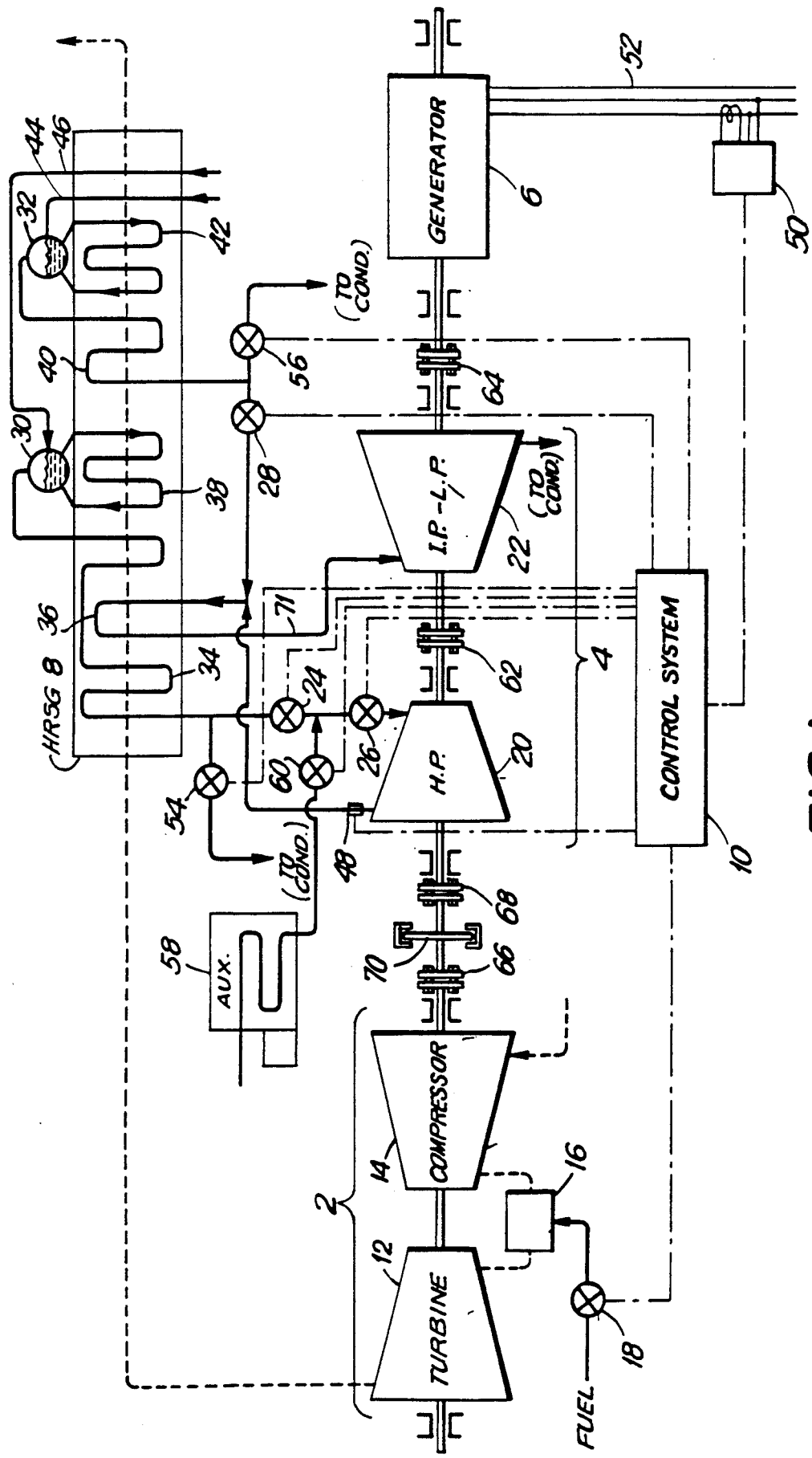

Referring to FIG. 1 of the drawing, a gas turbine 2 is connected in tandem with a steam turbine 4 to a load, such as generator 6. The hot exhaust gas from gas turbine 2 flows through a heat recovery steam generator (HRSG) 8, which supplies steam to steam turbine 4 The entire system is controlled by a unified control system designated 10.

The elements of gas turbine 2 are a turbine 12, air compressor 14, and combustion chamber 16 supplied with fuel through a fuel valve 18. Steam turbine 4 comprises a high pressure section 20 and a lower pressure section 22 (combined intermediate pressure and low pressure section) Primary throttle steam from HRSG 8 flows through a stop valve 24, and control values 26, to the inlet of the high pressure steam turbine section 20. A supplementary flow of "secondary" steam at a lower pressure level from HRSG 8 is admitted through a secondary steam valve 28, where it joins steam which has been expanded through turbine section 20.

Heat recovery steam generator 8 has associated with it a high pressure steam drum 30, low pressure steam drum 32, and contains banks of steam generating, reheating and feed water heating tubes which may vary in arrangement from one power plant to another. The disclosed arrangement includes high pressure superheat section 34, reheater section 36, high pressure steam generating tubes 38, low pressure steam superheat tubes 40, low pressure steam generating tubes 42, low pressure feed water heater 44 and high pressure feed water heater 46.

The control system 10 includes means for sensing an overspeed condition, here measured by an unbalance between applied power (positive torque) and load (negative torque) which would tend to create an overspeed condition. This could alternately comprise a speed sensing or acceleration sensitive device. The measurement of applied power is carried out using a steam pressure sensor 48 measuring the "cold" reheat pressure and the measurement of load is carried out using a kilowatt sensor 50 which is responsive to current and voltage on the generator output lines 52. See the aforementioned Eggenberger U.S. Pat. No. 3,198,954 for further details on such a power/load unbalance sensing system.

Steam bypass valves 54, 56 and an optional auxiliary steam generator 58 with auxiliary steam admission valve 60 are shown, it being understood that in actual practice a great many more valves and auxiliary devices would be necessary The rotating members of steam turbine sections 20, 22 are solidly coupled by a rigid (non-flexible) coupling 62 and, in turn, the steam turbine 4 is solidly coupled to the generator 6 by a rigid coupling 64. The rotating members of gas turbine 2 are solidly coupled to the rotating members of steam turbine 4 by means of rigid couplings 66, 68 and the system is provided with a single thrust bearing 70 for all of the tandem-connected shafts. Thus the rotating members are coupled together as a single rotor.

In accordance with the present invention the conventional intercept valve and the reheat stop valve are eliminated. A valveless steam conduit 71 directly connects the outlet of steam reheater section 36 with the inlet of lower pressure steam turbine section 22. Steam flowing through conduit 71 consists of expanded steam from the outlet of the high pressure turbine section 20 and supplementary steam flowing through supplementary steam valve 28 from the low pressure superheat tubes 40. In some plants having only a single pressure level HRSG, the supplementary steam would not be generated or added to steam entering the reheater 36.

MODIFICATION

Figure 2:
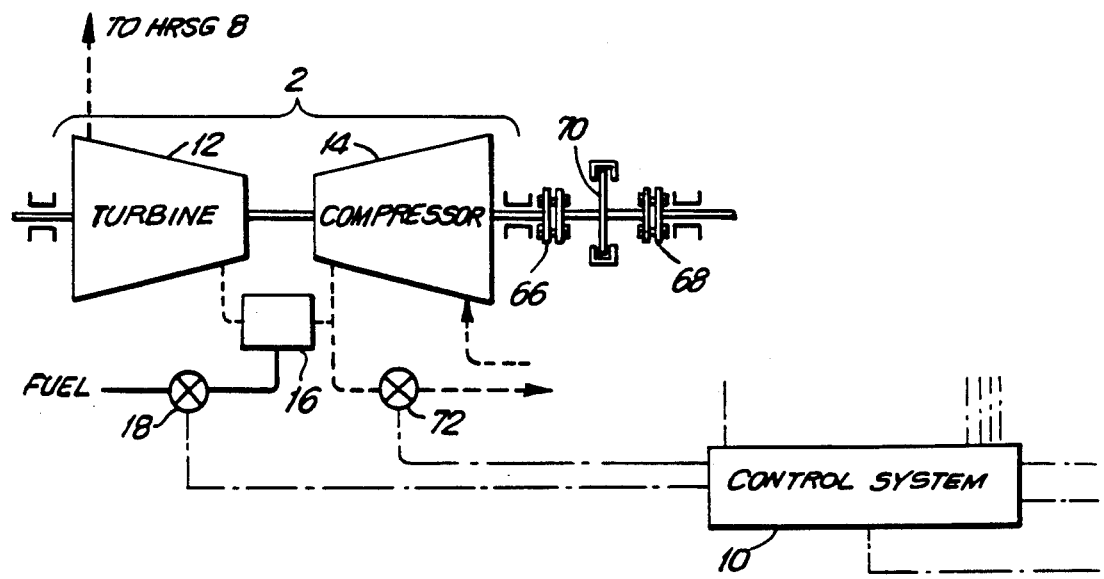

In accordance with a modified form of the invention illustrated in FIG. 2, a compressor discharge dump valve 72 is added to the combined cycle system of FIG. 1. Only a part of the entire powerplant is repeated in FIG. 2, the omitted portions being identical. Dump valve 72 is illustrated schematically as an electrically actuated valve operated by control system 10. Dump valve 72 is arranged to open upon a preselected unbalance between power and load as sensed by the steam pressure sensor 48 and the generator load sensor 50.

If an electrically operated valve 72 is used, other types of conditions may be sensed and used to control devices well known to those skilled in the art, such as preselected speed measured by a speed governing system. Acceleration of the shaft measured by an acceleration sensitive device may be also used to open dump valve 72.

Figure 3:
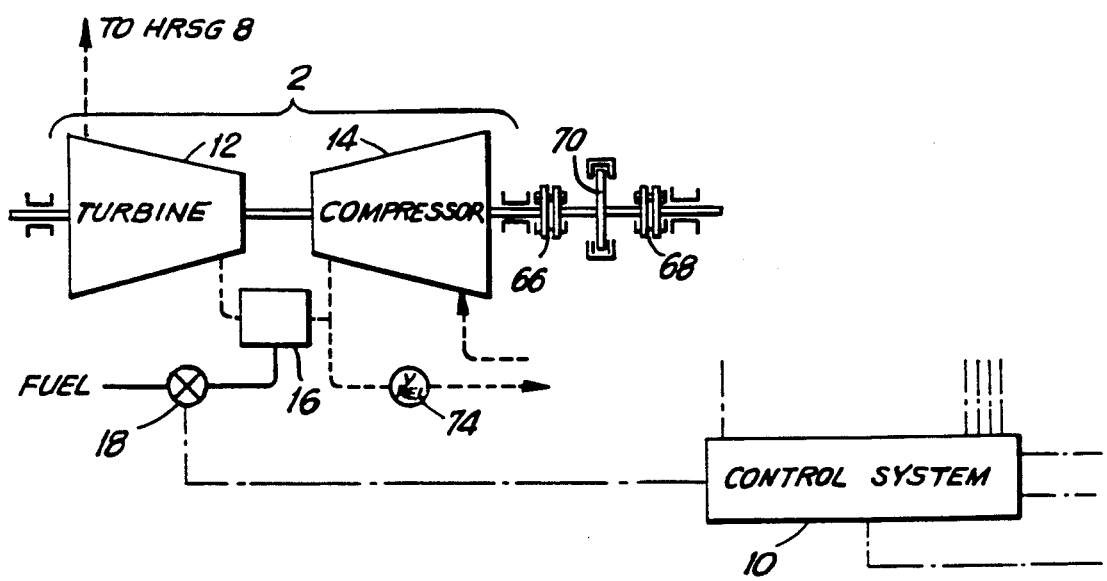

Another modification is shown in FIG. 3, where the electrically actuated dump valve 72 may be replaced by a Pressure actuated dump valve 74, so that no direct connection of the dump valve to the control system 10 is necessary. Dump valve 74 is arranged to open upon compressor discharge pressure exceeding a preselected value, which preselected value is indicative of an increase in speed above normal operating speed.

It should be understood that the usual intercept valve and reheat stop valve which would normally be placed between reheaters 36 and turbine section 22 have been eliminated in the FIG. 2 and FIG. 3 modifications also. This is possible because the solid coupling to the gas turbine 2 causes the steam turbine 4 to respond safely to the braking torque of gas turbine air compressor 14, which torque has been increased by dump valves 72 or 74 respectively, as explained below.

OPERATION

Upon loss of load by generator 6, a preselected unbalance between power and load is exceeded, and control system 10 operates fuel valve 18 to reduce fuel to the gas turbine, and simultaneously closes control valves 26 and secondary steam valves 28 to the steam turbine. Since the shafts are rigidly coupled the combined inertia of the rotating members of gas turbine, steam turbine and generator have greater ability to resist change in speed. Also, since the gas turbine air compressor 14 exerts a negative torque or braking effect on the rotor due to the energy required to compress air flowing through it, the compressor negative torque resists an overspeed condition (torque proportional to speed squared). Therefore, the rigidly coupled units, including the air compressor, are able to absorb the excess energy in reheat steam flowing freely through the valveless conduit 71, which enters turbine 22.

The usual intercept valve and reheat stop valve which would normally be placed between reheater 36 and turbine section 22 have been eliminated, and all of the steam in the reheater and the piping between the reheater and turbine when the electrical load is lost may expand through turbine section 22 without causing excessive overspeed. Because provision of intercept valve and reheat stop valve are a significant expense in a large combined cycle reheat steam turbine, elimination of the valves is a cost saving. Also since the rotating members are solidly coupled, only one control system is necessary for the single rotor. This is possible because the gas turbine 2, the steam turbine 4, and the generator 6 are all connected by solid couplings and will respond as a single unit upon loss of electrical load. This eliminates the need for separate overspeed protection of the steam turbine, as it can not become disconnected from the other rotors by failure of the flexible coupling of prior art combined cycle plants. The combination in a combined cycle power of rotors coupled solidly together and valveless conduit from the reheater has a much lower potential for excessive overspeed than a conventional combined cycle power with reheat steam turbine, which before my invention required intercept and reheat stop valves.

In operation of the FIG. 2 modification, the compressor discharge dump valve 72 is opened by control system 10 to dump air from the discharge of the compressor 14 ahead of the combustors 16. This further increases the braking effect of compressor 14 in two ways.

First, air flow through the compressor is increased, increasing the torque required to drive the compressor and therefore, the braking load.

Secondly, air flow to the combustor 16 is reduced, reducing the fuel input required to maintain combustion and therefore, reducing the gas turbine output, thereby increasing the net braking load.

Similar action occurs in FIG. 3 with the pressure actuated dump valve 74, except that its action is independent of the control system 10. The control system functions in the normal way to regulate fuel valve and steam control valves to reduce speed.

While there has been described what is considered to be the preferred embodiment of the invention, other modifications will occur to those skilled in the art, and it is desired to secure in the appended claims all such modifications as fall within the true spirit and scope of the invention.

I claim:

1. An improved combined cycle power plant and overspeed protection system of the type having a reheat steam turbine including a high pressure steam turbine section with at least one control valve, and a lower pressure steam turbine section; a gas turbine including a turbine section, a combustor, a fuel valve supplying said combustor, and an air compressor with a discharge end leading to said combustor; a load driven by said reheat steam turbine and said gas turbine; said reheat steam turbine, said gas turbine and said load all having rotating members; a heat recovery steam generator heated by said gas turbine, including a high pressure steam generating section supplying steam to said high pressure steam turbine section through said control valve, and a steam reheater section receiving steam exhausted from said high pressure steam turbine section; the improvement comprising:

a valveless steam conduit connected between the outlet of said steam reheater section and the inlet of said lower pressure steam turbine section, a plurality of solid couplings serving to solidly couple said rotating members together as a single rotor, said rotor having a single thrust bearing, control means for sensing a potential overspeed condition operatively connected to said control valve to prevent overspeed, whereby the steam in said steam reheater and in said valveless steam conduit may freely expand through said lower pressure steam turbine and potential overspeed of said rotor is resisted by the combined inertia of said coupled rotating members and by the braking torque of said air compressor; and a dump valve interposed between said air compressor discharge end and said combustor, and responsive to a potential overspeed condition, whereby upon opening of said dump valve, compressor air flow is increased and air flow to the combustor is reduced, to increase the compressor braking torque on said rotor.

2. The improvement according to claim 1, wherein said dump valve is an electrically actuated valve and wherein said control means is arranged to actuate said dump valve upon said potential overspeed condition.

3. The improvement according to claim 1, wherein said control means is responsive to power/load imbalance exceeding a preselected value.

4. The improvement according to claim 1, wherein said control means is responsive to speed of said single rotor exceeding a preselected value.

5. The improvement according to claim 1, wherein said control means is responsive to acceleration of said single rotor.

6. A combined cycle gas and steam turbine power plant overspeed protection system comprising:

a gas turbine with its associated combustor and air compressor, a high pressure steam turbine, at least one lower pressure steam turbine and an electrical generator all having rotating members which are solidly coupled together so as to rotate together as a single rotor unit at all times including sudden loss of load occurrences;

a steam reheater disposed to transfer heat form the gas turbine exhaust to steam exhausted from said high pressure steam turbine before it is input to said at least one lower pressure steam turbine;

a valveless steam conduit connecting an output of the steam reheater with an input of said lower pressure steam turbine;

a single overspeed control having a sensor which detects a sudden loss of load occurrence and, in response, directly activating simultaneously steam and fuel valves to reduce steam input to said high pressure steam turbine and to reduce fuel input to said gas turbine combustor but which permits residual reheater steam output to continue to expand freely through said at least one lower pressure steam turbine; and an air dump valve located to vent at least a portion of the air compressor output during sudden loss of load occurrences sufficient to immediately increase air compressor braking torque provided to said single rotor unit while simultaneously permitting further reduction of fuel input to said gas turbine combustor without losing combustion.

7. A combined cycle gas and steam turbine power plant overspeed protection system as in claim 6, wherein said dump valve is electrically actuated by said overspeed control.

* * * * *